United States Patent [19]
Holemans

[11] Patent Number: 5,715,573
[45] Date of Patent: Feb. 10, 1998

[54] SELF LATCHING HINGE

[75] Inventor: Walter Holemans, Washington, D.C.

[73] Assignee: CTA Space Systems, Inc., Rockville, Md.

[21] Appl. No.: 602,207

[22] Filed: Feb. 15, 1996

Related U.S. Application Data

[63] Continuation of Ser. No. 446,514, May 22, 1995, abandoned.

[51] Int. Cl.⁶ .................... E05D 3/06; E05D 11/06; E05F 1/08
[52] U.S. Cl. .................... 16/287; 16/292; 16/366; 16/371; 244/173
[58] Field of Search ................ 16/280, 285–288, 16/292, 302, 350, 366, 368–371, 78, 80, 298; 244/173

[56] References Cited

U.S. PATENT DOCUMENTS

| | | | |
|---|---|---|---|
| 414,384 | 11/1889 | Dudden | 16/80 |
| 1,038,222 | 8/1912 | Griffenberg . | |
| 1,925,209 | 9/1933 | Schwartz . | |
| 1,926,431 | 9/1933 | Busch | 16/298 |
| 2,102,086 | 12/1937 | Mueller . | |
| 2,777,155 | 1/1957 | Fata . | |
| 3,514,893 | 6/1970 | Paksy | 16/282 |
| 3,881,221 | 5/1975 | Schmidt . | |
| 4,290,168 | 9/1981 | Binge | 16/271 |
| 4,393,541 | 7/1983 | Hujsak et al. | 16/297 |
| 4,410,151 | 10/1983 | Hoppner et al. . | |
| 4,532,674 | 8/1985 | Tobey et al. | 16/295 |
| 4,534,079 | 8/1985 | Tucker . | |
| 4,561,614 | 12/1985 | Olikara et al. | 244/173 |
| 4,615,637 | 10/1986 | Pelischek | 16/370 |
| 4,666,107 | 5/1987 | Berry . | |
| 4,667,899 | 5/1987 | Wedertz . | |
| 4,821,373 | 4/1989 | Maidment et al. | 16/292 |
| 4,825,395 | 4/1989 | Kinser, Jr. et al. . | |
| 4,875,252 | 10/1989 | Falconer et al. | 16/358 |
| 4,880,188 | 11/1989 | Roth et al. . | |
| 5,098,042 | 3/1992 | Viale . | |
| 5,131,955 | 7/1992 | Stern et al. . | |
| 5,410,779 | 5/1995 | Esman et al. | 16/370 |

FOREIGN PATENT DOCUMENTS

| 0311026 | 4/1989 | European Pat. Off. | 244/173 |
|---|---|---|---|

OTHER PUBLICATIONS

Beacon Antenna Assembly.

*Primary Examiner*—Chuck Mah
*Assistant Examiner*—Donald M. Gurley
*Attorney, Agent, or Firm*—Fish & Richardson P.C.

[57] ABSTRACT

The self latching hinge of the present invention includes a hinge having a hinge housing with a receiving channel and at least one receiving bore wherein the hinge housing is operably secured to a first hinged component. A piston having a concentric compression spring is operably received within the at least one receiving bore for movement between an extended position and a retracted position. One side of a latching link is operably connected to the at least one piston and another side of the latching link is connected to a second hinged component. When the at least one piston is in an extended position, the latching link is removed from the channel and when the at least one piston is in a retracted position, the latching link is received within the channel to form a locked and oriented connection between the first and second hinged components.

22 Claims, 6 Drawing Sheets

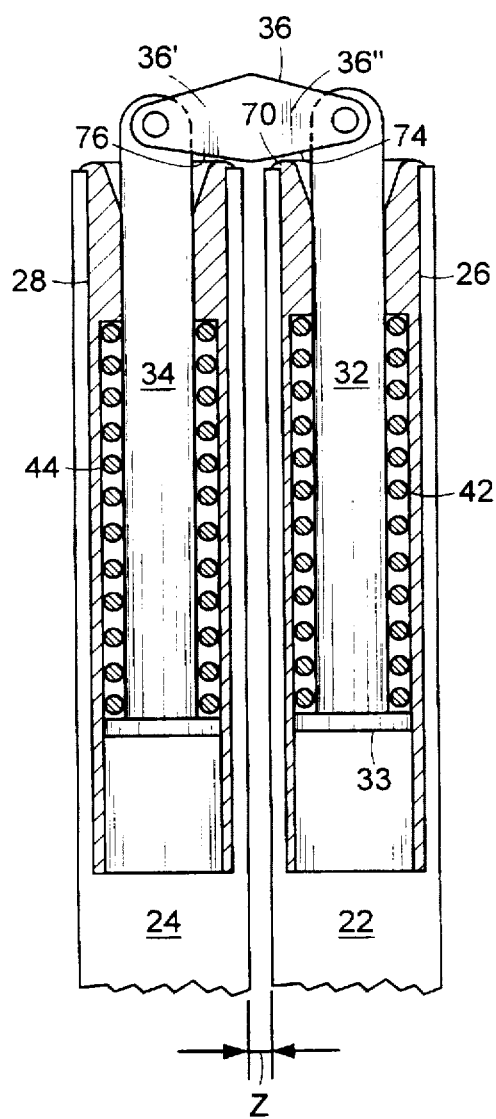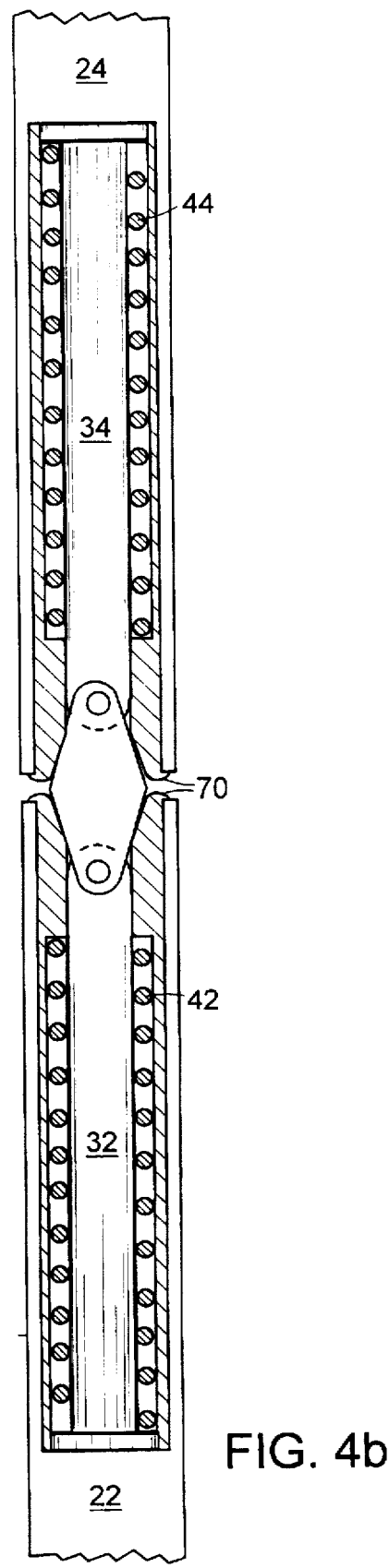
FIG. 4a
FIG. 4b

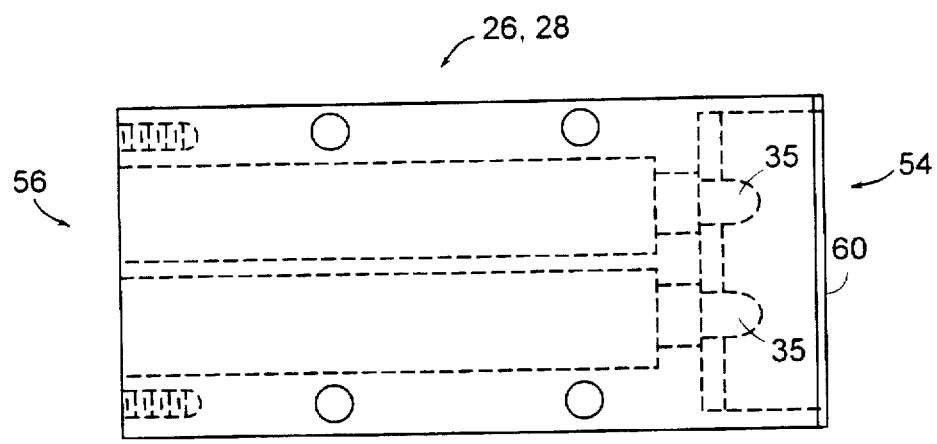
FIG. 5
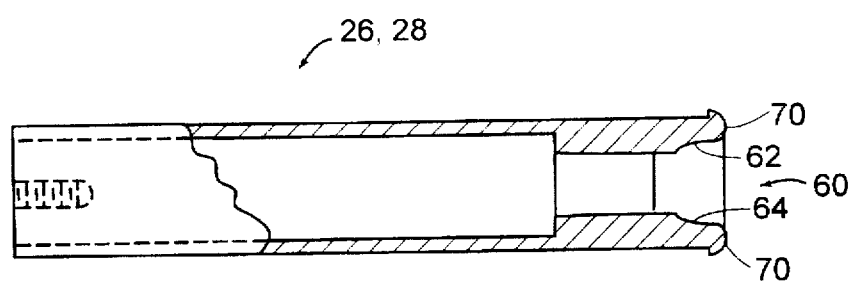
FIG. 6
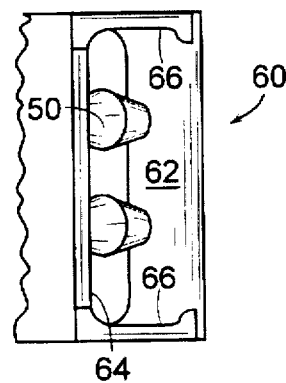 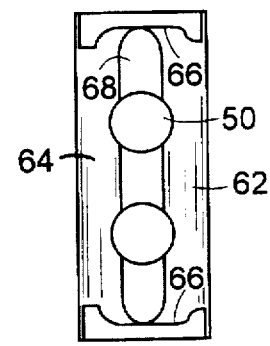
FIG. 7a  FIG. 7b

SELF LATCHING HINGE

This application is a continuation of application Ser. No. 08/446,514, filed May 22, 1995 now abandoned.

BACKGROUND OF THE INVENTION

The present invention relates to a self latching hinge assembly for hinging together two components. More specifically, the invention is directed to an improved hinge for use in deploying spacecraft components such as solar panels, antenna booms, and sensors.

In order to comprehend some of the problems which plague aerospace engineers in the deployment of spacecraft components, it is important to understand a few underlying principles. A launch vehicle (e.g., a rocket) which carries a satellite to be placed in orbit undergoes aerodynamic drag and heating while exiting the earth's atmosphere. As such, it is desirable to manufacture the launch vehicle with a minimum cross-sectional area in order to reduce drag and heating effects. Spacecraft (e.g., an orbiting satellite), on the other hand, are preferably manufactured to have maximum cross-sectional area to simplify the layout of instruments and obtain the optimal orientation of deployed spacecraft structures such as solar panels.

Generally, the result of these contrary goals is that spacecraft are manufactured with relatively small volumes and cross-sectional areas. In order to meet stringent volume and area restrictions placed on spacecraft, designers must densely pack all of the instruments and components (viz. solar panels, antenna booms, sensors, etc.). Specifically, the instruments are densely packed and arranged within the spacecraft during the flight into orbit.

Once the launch vehicle is separated from the spacecraft and orbit is successfully achieved, the once densely packed spacecraft instruments are deployed. The spacecraft components are hinge connected to the body of the spacecraft and rotate about the hinge while moving from a stowed position to a deployed position. Generally, the spacecraft component is held in its stowed position against the force of a tension or torsion spring by a retention device which restrains the spacecraft component from moving into a deployed position. When it is desired to deploy the spacecraft component, a control signal changes to cause the retention device to release the deployable instrument, allowing it to move into its deployed position. In this, the hinge about which the spacecraft component rotates is of critical importance.

Engineers have been grappling with a fundamental principle in spacecraft deployables for forty years: to concentrate as many devices as possible in the smallest space and have them deploy reliably, predictably, quickly, and accurately for a minimum in weight, volume, and cost. It is the hinge about which the spacecraft components pivot which must be carefully designed and manufactured in order to achieve these goals in deploying spacecraft components. If a hinge fails to deploy a spacecraft component correctly or at all, severe consequences may result preventing the effective operation of the spacecraft. For example, if some of the solar panels which power a satellite fail to deploy, the operation of the satellite and the service it provides may be severely hampered.

Several critical design factors are recognized in the design of the subject spacecraft hinges. First, the hinge must be capable of supplying a motive force which causes the spacecraft component to deploy once the retention mechanism is signalled to release. Second, the hinge must be capable of providing a hard stop which will prevent the deployed spacecraft component from further deployment. Third, the hinge must provide a latch to prevent the deployed spacecraft component from moving back into its stowed position. Fourth, the hinge must provide a means for calibrating, typically in the form of calibration screws, which allow for the fine tuning of the hinge components. That is, the hinge must deploy the spacecraft component at a predefined and precise angle with respect to the spacecraft. Although not absolutely necessary on smaller spacecraft, some prior art hinges provide a damper which prevents the instrument from receiving damaging shock during deployment.

Although some prior art hinges have enjoyed success in achieving the above identified design factors, they have proven to be undesirable for many reasons. First, prior art hinges generally consist of many complex parts which significantly increase the possibility of hinge failure. For example, many hinges utilize torsion or tension springs and a latch which secures the hinge components into a locked deployed position. The use of torsion or tension springs to provide a motive force in the deployment of a spacecraft component is undesirable because any failure in the spring will cause complete failure of the hinge and prevent proper deployment of the spacecraft component. Moreover, the more complex the hinge mechanism becomes, the greater the time and cost associated with making and testing the hinge assembly.

Prior art hinges are relatively heavy. At a launch cost of $15,000 to $100,000 per pound (in 1995 dollars) of launch weight, additional weight in spacecraft components can often "kill" a spacecraft program. The prior art hinges are also large in volume, which, as noted above, is something to avoid in spacecraft design.

Another undesirable feature of the prior art hinges is the large number of fasteners needed to secure the hinge to the body of the spacecraft and the hinged components. This is undesirable in that it damages the integrity of the spacecraft component and provides a structural discontinuity. Moreover, when used with solar arrays, prior art hinge bodies cover outer surfaces of the solar panels when secured to the panels. This complicates the layout of the panels and consumes valuable solar cell area.

An additional design limitation in prior art hinges is that most of the volume of the hinge is placed between adjacent hinge solar panels thereby creating a relatively large space between adjacent panels. Specifically, in prior art hinge schemes, the distance of separation between the solar panels when in a stowed position is approximately 0.50 inches and when in a deployed position is approximately 1.50 inches. This space is undesirable because it reduces the available cell surface area, increases system inertia, and decreases the rigidity of connection between adjacent spacecraft components.

Prior art hinges also utilize calibration screws in order to permit adjustment of the deployment angle of a spacecraft component. The use of such screws is undesirable because it increases the likelihood of hinge failure and dramatically reduces deployed stiffness.

Significantly, prior art hinges do not easily provide precise orientation of the deployed spacecraft component with respect to the spacecraft itself. This orientation is critical in certain spacecraft deployables, such as spacecraft antenna. The well known Global Positioning System ("GPS") is now used in the determination of the precise position of a spacecraft. An antenna which receives position data from the GPS must be oriented precisely in all six degrees of freedom (viz. x, y, and z-axis and around the x, y, and z-axis). In a preferred antenna scheme, a spacecraft will deploy four GPS antennas each of which will sense a unique position. Using a simple mathematical algorithm, the four positions can be reduced to provide the satellite with not only its orbit and position, but its orientation as well. To accomplish this result, the four GPS antennas must be placed as far away from each other as possible when deployed and must point very accurately. Prior art hinges are not capable of providing a simple, reliable, predictable, and accurate means for assuring a precise orientation in all six degrees of freedom.

Although the limitations of the prior art hinges discussed above specifically addressed the deficiencies of prior art hinges utilized in deploying spacecraft components, some of the noted limitations are equally pertinent to prior art hinges for all uses and in all environments. For example, the hinged connections between various components in automobiles (e.g., trunk door), airplanes (e.g., cargo doors), and household appliances (e.g., oven doors) which are self motive and require latching and proper alignment would admit to worthwhile improvement as well.

The deficiencies and limitations described above are not intended to be exhaustive, but rather are among many which demonstrate that although significant attention has been devoted to spacecraft hinges, the spacecraft hinges appearing in the past will admit to worthwhile improvement.

OBJECTS AND BRIEF SUMMARY OF THE INVENTION

It is therefore a general object of the invention to provide a novel hinge for deploying spacecraft components which will obviate or minimize deficiencies of the type previously described.

It is a specific object of the invention to provide a hinge which is reliable, predictable, quick, and accurate in the deployment of spacecraft components.

It is another object of the invention to provide a hinge for deploying spacecraft components which is capable of orienting a deployed spacecraft component with precision in all six degrees of freedom.

It is still another object of the invention to provide a hinge for deploying spacecraft components which is self calibrating.

It is yet still another object of the invention to provide a hinge for deploying spacecraft components which provides a stiff structural connection between adjacent hinged components.

It is still another object of the invention to provide a hinge for deploying spacecraft components which is self redundant such that failure of any given hinge component will not sacrifice hinge performance.

It is yet another object of the invention to provide a hinge for deploying spacecraft components which is light weight, occupies minimal volume, and made from a minimum of parts.

It is still yet another object of the invention to provide a hinge for deploying spacecraft components which may be easily manufactured and does not require the use of fasteners.

It is yet still another object of the invention to provide a hinge for deploying spacecraft solar panels which may easily be installed without affecting panel integrity and which simplifies the layout of the solar panels.

It is yet another object of the invention to provide a hinge for deploying a spacecraft solar array which minimizes the gap between adjacent solar panels in both the stowed and deployed positions and maximizes the available surface area for solar cells of the solar panels.

BRIEF SUMMARY OF A PREFERRED EMBODIMENT OF THE INVENTION

A preferred embodiment of the invention which is intended to accomplish the foregoing objects includes a hinge having a hinge housing with a tapered receiving channel and at least one receiving bore wherein the hinge housing is operably secured to a first hinged component. A piston having a concentric compression spring is operably received within the at least one receiving bore for movement between an extended position and a retracted position. One side of a latching link is operably connected to the at least one piston and another side of the latching link is connected to a second hinged component. When the at least one piston is in an extended position, the latching link is removed from the channel and when the at least one piston is in a retracted position, the latching link is received within the tapered channel to form a locked and oriented connection between the first and second hinged components.

DRAWINGS

Other objects and advantages of the present invention will become apparent from the following detailed description of a preferred embodiment thereof taken in conjunction with the accompanying drawings, wherein:

FIGS. 4a and 4b are front views of the hinge of the present invention as it appears when a spacecraft component is in a stowed position and a deployed position, respectively.

FIG. 5 is an elevation view of a hinge housing, with the hinge pistons installed, of the hinge of the present invention.

FIG. 6 is a plan view of a hinge housing of the hinge of the present invention.

FIGS. 7a and 7b are perspective and frontal views, respectively, of a tapered receiving channel of the hinge housing of the present invention.

DETAILED DESCRIPTION

Figure 1:
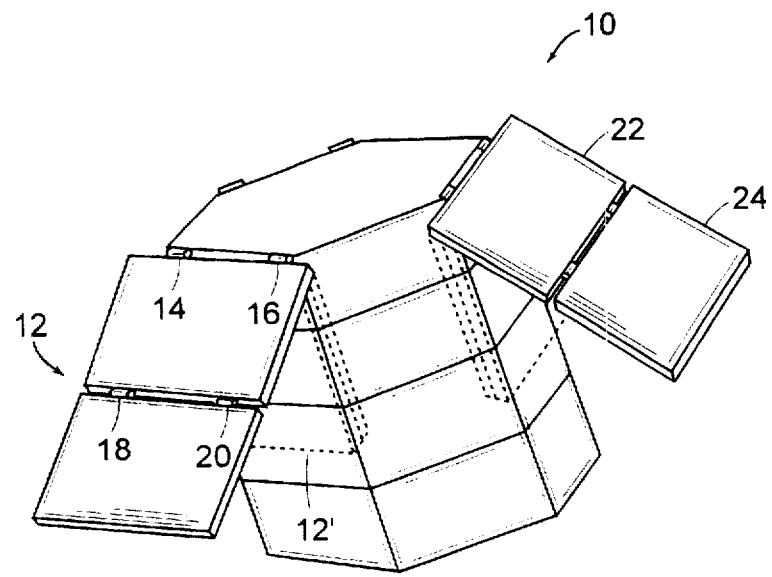
FIG. 1 is a perspective view of a satellite with three solar arrays in their stowed and deployed positions wherein the solar panels of the arrays are hinge connected with the hinge of the present invention.

Referring now to the drawings and particularly to FIG. 1, there is shown a satellite 10 with deployed solar arrays 12.

In the satellite depicted in FIG. 1, there are three solar arrays each of which has two solar panels 22 and 24. The solar arrays are hinge connected to satellite 10 through hinges 14 and 16. The solar arrays 12' which appear in shadow in FIG. 1 indicate the solar arrays in their stowed position. As described above, once the satellite is placed in proper orbit, a retention mechanism (not shown) is activated thereby releasing the solar array and allowing deployment to occur. The solar arrays 12 indicate the solar arrays in a deployed position. The particular deployment angle will vary depending on the spacecraft component being deployed and the spacecraft.

Although the hinge of the present invention is shown and described as embodied in a satellite and used to deploy a solar array, it is to be understood that the hinge of the present invention is useful in a variety of environments and uses. For example, the hinge of the present invention may be used in the connection of any spacecraft component (e.g., antenna booms and sensors) to any type of spacecraft (e.g., satellite, space shuttle, or space capsule), or between components (e.g., adjacent panels of a solar array).

Moreover, the hinge of the present invention is advantageous in other commercial environments. For example, the hinge of the present invention provides advantageous results when used in the hinged connection of automobile trunk doors, airplane cargo doors, and oven doors. Specifically, once an operator releases the door, the novel structure of the hinge of the present invention provides a self motive opening force, self aligning capability, and self latching capability not found in prior art hinges, as more completely described below.

Figure 2:
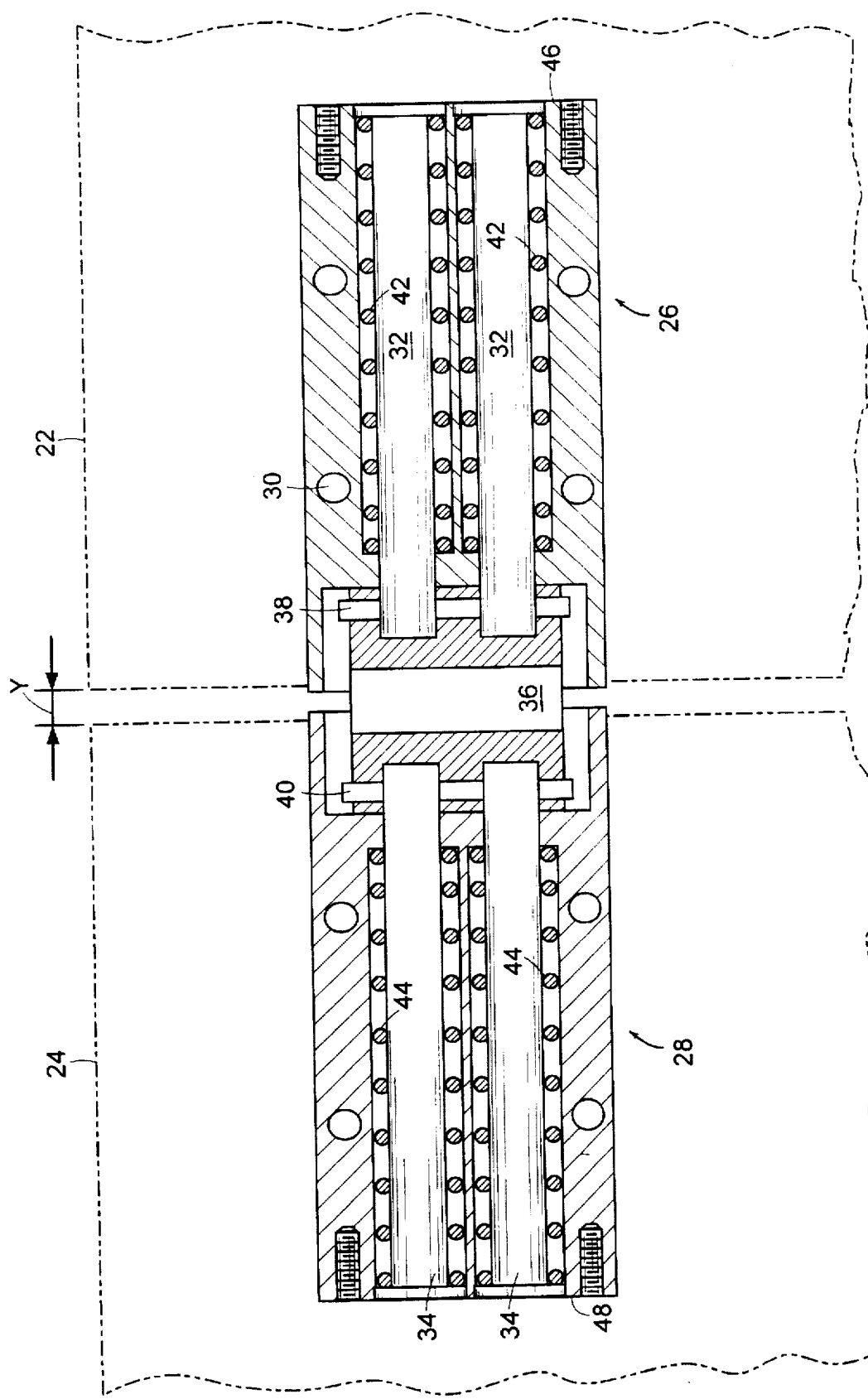
FIG. 2 is an elevation view of the hinge of the present invention imbedded within the body of adjacent solar panels.

Referring now to FIG. 2, there is shown a hinge 18 of the present invention. The hinge 18 shown in FIG. 2 is the dual housing embodiment which connects adjacent solar panels. The single housing embodiment of the hinge of the present invention is used for the connection of solar panel 22 to the body of the satellite 10 as described in more detail below in reference to FIG. 10, 11a, and 11b. It is to be understood that the hinge 18 is identical in construction and attachment to hinge 20, see FIG. 1, and therefore the description of structure and operation of hinge 18 is applicable to that of hinge 20. The hinge 18 of the present invention consist of a first hinge housing 26 and a second hinge housing 28. The first hinge housing 26 is imbedded in solar panel 22 of the solar array 12, 12'. The second hinge housing 28 is imbedded in solar panel 24 of the solar array 12, 12'. Preferably, during manufacture, the first and second hinge housings 26, 28 are permanently imbedded into the respective panels with an adhesive conventionally used in the aerospace industry—for example, the SCOTCHWELD 1838 B/A brand adhesive manufactured by 3M Corporation. Installation holes 30 can be used to allow the adhesive to establish a secure and permanent bonding of the housings 26, 28 to the inner surfaces of the solar panels 22, 24. Of course, other suitable securing means are also within the scope of the invention.

Due to the novel structure of the hinge of the present invention, it is manufactured more simply and at less cost than any prior art hinge which accomplishes similar, although less reliable, results. The hinge structure consist of only five primary components thereby reducing manufacturing complexity and cost. Moreover, in having only a few primary components, the hinge of the present invention has a total weight substantially less than that of hinges appearing in the past. Referring to FIG. 2, the hinge of the present invention consists of: a hinge housing 26, 28; at least one piston 32, 34; a latching link 36; link pin 38, 40; at least one compression spring 42, 44 corresponding to the number of pistons; and a rear housing plate 46, 48 for enclosing the housing.

Figure 3:
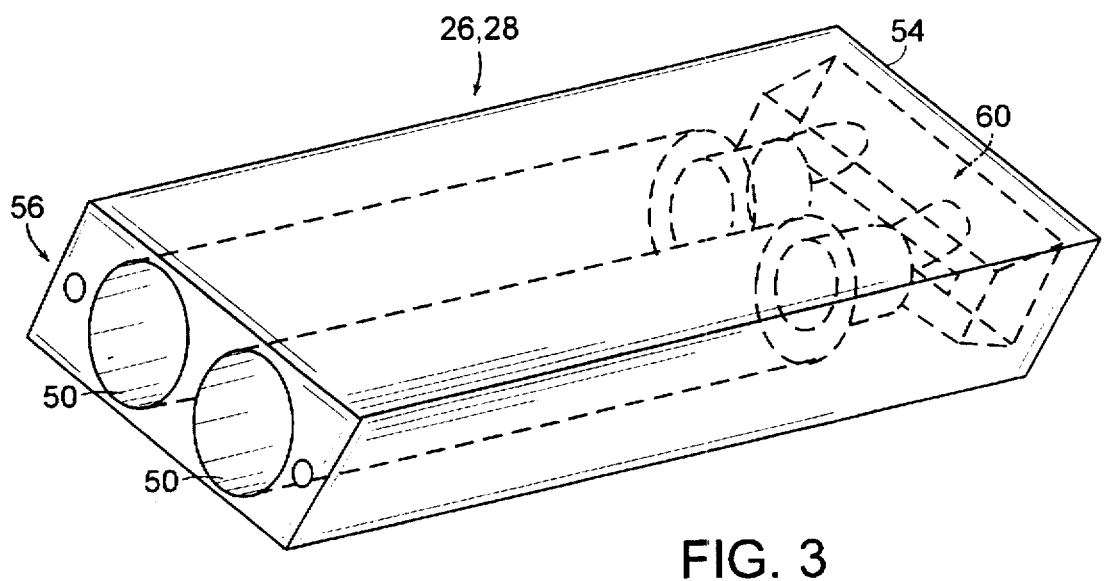
FIG. 3 is a perspective view of the hinge housing of the hinge of the present invention.

Referring to FIG. 3, there is shown the hinge housing 26, 28 in perspective view. In a preferred embodiment, the housing 26, 28 is provided with two through bores 50 which extend from a hinge channel 60 located in the front end 54 of the housing 26, 28 to a rear end 56 of the hinge housing 26, 28. The use of two bores 50 with corresponding pistons 32, 34 is preferable because it provides for an even distribution of force acting on the link 36. Moreover, the two bore design is preferable because even if failure of a hinge component (e.g., piston link pin or spring) occurs in one of the bores, the components contained in the other bore will still operate to place the link 36 within the channel 60. However, a single bore having a single piston is also within the scope of the invention for accomplishing the disclosed advantageous results. In the preferred embodiment, the hinge housing is rectangular in cross-section as depicted in FIG. 3 which allows for simplified manufacturing and easy installment into panels 22 and 24. Again, alternative shapes and dimensions are also within the scope of the present invention.

The operation of the hinge and the interaction of the hinge components is better understood with reference to FIGS. 4a and 4b. FIG. 4a shows the hinge 18 when the panels 22 and 24 are in a stowed position (i.e., before the satellite is placed into its proper orbit). FIG. 4b shows the hinge 18 when the panels 22 and 24 are in a deployed, locked, and oriented position. When the panels are in a stowed position (note FIG. 4a), the pistons 32, 34 are in an extended position whereby they extend into and out of the channel 60 formed in the front end 54 of the hinge housing 26, 28. A compression spring 42, 44 is positioned concentric about the piston 32, 34 within the housing bores 50. In this, when the piston 32, 34 is in its extended position, the piston head 33 compresses the compression spring which in turn supplies a countering force toward the rear end 56 of the hinge housing 26, 28. As noted above, in order to deploy the solar array, typically a retention mechanism is moved which enables the distal ends (i.e., the ends opposite the imbedded hinge housing) of the solar panels to separate. Once the distal ends of the solar panel are free to separate, the compression spring 42, 44 supplies a force to push the pin 32, 34 toward the rear end 56 of the housing 26, 28.

The use of a compression spring is preferable over an extension spring or torsion spring because it is self redundant. That is, even if the compression spring fractures, it will still provide a countering force which causes the piston to move from its extended position into its retracted position. This is a significant advantage over prior art hinges which utilize tension and torsion springs whereby a spring failure completely disables the device.

In some commercial applications, it may be desirable to provide a hinge which is capable of automatic opening and closing of the hinged components—for example, doors which open automatically to assist the handicapped. In such a commercial embodiment, the pistons 32, 34 are extended/ retracted using hydraulic fluid which acts on piston head 33 in order to extend and retract the pistons 32, 34.

As shown in FIGS. 2, 4a, 4b, and 5, the end of the piston 32, 34 opposite the piston head 33 is operably connected to the latching link 36. Specifically, the piston 32, 34 has attachment prong 35 formed at an end opposite the piston head 33. The attachment prong 35 is connected to mating attachment prongs formed on the latching link 36. In this, when the compression spring 42, 44 forces the piston toward its retracted position (i.e., when the piston head 33 is in its most distal position away from the front end 54 of the hinge housing 26, 28), the latching link 36 is caused to move into its latched position as described in more detail below.

The front end 54 of the hinge housing 26, 28 is described in more detail with reference to FIGS. 5, 6, 7a, and 7b. As shown in these FIGS., the front end 54 of the hinge housing 26, 28 is provided with a receiving channel 60. The receiving channel 60 is configured to correspond in shape to a side 36', 36" of the latching link 36. Preferably, the channel 60 consists of first 62 and second 64 tapered mating surfaces which operably interact with surfaces of latching link 36 as described in more detail below. The tapered mating surfaces 62, 64 extend from a wall 68 which defines the bottom of channel 60. As shown in FIG. 7a, the piston bores 50 extend through bottom wall 68 and a portion of the tapered mating surfaces 62, 64. The channel 60 is further defined by opposing walls 66. Preferably, a small radius of curvature is provided between the tapered mating surfaces 62, 64 and the adjacent walls 66, which allows for easier manufacturing of the channel and decreases stress concentrations. The tapered mating surfaces 62, 64 extend from bottom wall 68 and, preferably, terminate at pivot ledges 70 which define the opening of channel 60. The pivot ledges 70 are rounded surfaces about which the latching link 36 pivots when the pistons 32, 34 move from their extended positions to their retracted positions. The rounded surface of the pivot ledges 70 substantially reduces stress concentrations in the interaction of the link 36 and ledges 70. Moreover, the interaction between the link 36 and the ledges 70 occurs along a line of contact as opposed to a single point of contact. Again, this is preferable because it substantially reduces stress concentration and allows for more reliable hinge performance.

Figure 8:
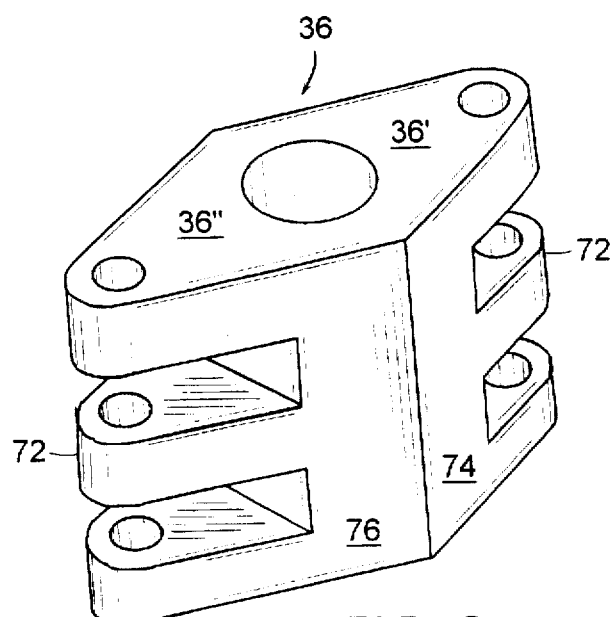
FIG. 8 is a perspective view of the hinge latching link of the hinge of the first embodiment of the present invention.
Figure 9A:
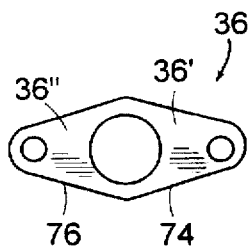
FIGS. 9a and 9b are plan and side views, respectively, of the hinge latching link of the hinge of the first embodiment of the present invention.
Figure 9B:
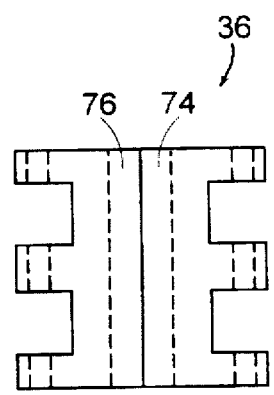

The latching link 36 is described with reference to FIGS. 8, 9a, and 9b. As previously discussed, the hinge of the present invention provides for superior results in the hinged connection of two solar panels of a solar array. In this, a first hinge housing 26 is imbedded into a panel 22 and a second hinge housing 28 is imbedded into a panel 24. The hinge housings 26, 28 are provided with at least one bore 50 which receives a piston 32, 34 having attachment prongs 35. The only connection between the hinge housing 26 and hinge housing 28, and thus the solar panels 22 and 24, is through latching link 36. Latching link 36 comprises a first side 36' and a second side 36". The first and second sides of latching link 36 are formed with attachment prongs 72 which interlock with attachment prong 35 formed on the pistons 32, 34.

As shown in FIGS. 2 and 4, the receiving channels 60 of the housings 26, 28 operably interact with a corresponding side of latching link 36 when the solar panels are in a deployed position. Specifically, side 36' of latching link 36 is received within channel 60 of the housing 26, and side 36" is received within channel 60 of the housing 28. The latching link 36 is generally diamond shaped in plan view as shown in FIG. 9a. Preferably, side 36' of latching link 36 is defined by an outer surface 74 consisting of two planar surfaces which merge at the attachment prongs 72. Similarly, side 36" of latching link 36 is defined by an outer surface 76 consisting of two planar surfaces which merge at the attachment prongs 72.

The interaction of the latching link with housings 26 and 28 is better understood with reference to FIGS. 4a and 4b. When the solar array 12' is in a stowed position (note FIG. 1), the pistons 33 and 34 are in an extended position and latching link 36 is removed from channel 60 of the housings 26 and 28. In this position, latching link 36 operably abuts pivot ledge 70 of the channel 60. Specifically, planar surface 74 of latching link side 36' abuts pivot ledge 70 of channel 60 of housing 26, and planar surface 76 of latching link side 36" abuts pivot ledge 70 of channel 60 of housing 28. As previously noted, the pivot ledges are rounded which reduces the stress concentrations acting on the ledges 70 and the planar surfaces 74 and 76. Once the solar panels are allowed to deploy, the compression springs 42 and 44 apply a force to piston heads 33 of pistons 32 and 34 which causes the pistons to move from their extended positions out of bores 50 and channel 60 into a retracted position within bores 50 (except for the piston attachment prong 35 which remains extended into channel 60 for attachment to prongs 72 of link 36). As the pistons 32 and 34 move into their retracted position, latching link 36 moves into a received position within channel 60 of the housings 26 and 28. Specifically, surface 74 of latching link side 36' and surface 76 of latching link side 36" operably interact in rotating and sliding contact. That is, as the link side 36' moves into channel 60, the ledge 70 slides over surface 74 as it pivots about the link 36. Similarly, as the link side 36" moves into channel 60, the ledge 70 slides over surface 76 as it pivots about link 36. During this interaction, solar panels 22 and 24 move into a deployed position.

Once the pistons 32 and 34 are in a retracted position and sides 36' and 36" of latching link 36 are received in the respective channels 60, the solar panels are fully deployed and locked into position. Moreover, the solar panels are properly oriented in all six degrees of freedom i.e., motion in the X, Y and direction and rotation about the X, Y and Z axes. In its received position, the latching link 36 is completely restrained from movement in all six degrees of freedom through the interaction of its surfaces with the mating surfaces of channel 60. Specifically, both of the planar surfaces 74 of side 36' abut surfaces 62 and 64 of channel 60 of housing 26. Similarly, both surfaces of the planar surface 76 of side 36" abut surfaces 62 and 64 of channel 60 of housing 28. The compression springs 42 and 44 maintain a high degree of force on piston head 33 thereby maintaining the latching link sides 36' and 36" in the received and seated positions.

The hinge design of the present invention allows for reliable and quick solar array deployment. Once the solar panels are released for deployment, the compression springs 42 and 44 force the pistons 32 and 34 into the retracted position thereby causing channel ledges 70 to slide over the surfaces of the latching link 36 as the housings 26 and 28 rotate about the link 36. As the hinge housings 26 and 28 rotate about the link 36, the sides 36' and 36" of the latching link are moved into the respective channel 60 of the housings 26 and 28, whereby the surfaces 74 and 76 of the link 36 abut and mate with the surfaces 62 and 64 of the channel 60. Significantly, the hinge design of the present invention is self latching and orienting. The locking relationship between the link 36 and the channel 60 of the housings 26 and 28 assures that the housings 26 and 28, and thereby the solar panels 22 and 24, do not move in any of the six degrees of freedom. Moreover, the solar panels are deployed in accordance with a predetermined orientation. This orientation is defined by the interaction of latching link 36 and channel 60 of housings 26 and 28. In the embodiment shown in FIGS. 2, 4a, and 4b, the solar panels 22 and 24 are aligned in a linear relationship with respect to each other, and solar panels 22 and 24 are aligned at a predetermined angle with respect to the body of the satellite as described below. Of course, the desired alignment between adjacent solar panels may be adjusted by merely altering the relationship of interacting surfaces which define link 36 and channel 60.

It is to be understood that the latching and orienting feature of the present invention could be achieved with alternative structural designs. Specifically, the configuration of the channel 60 and link 36 is not limited to the disclosed shape. Any relationship between the link 36 and channel 60 which allows for a structural connection between the imbedded hinge housings 26 and 28 is within the scope of the present invention. Moreover, the relative angle between hinged components 22 and 24 (note FIG. 1) can be adjusted by merely adjusting the configuration of latching link 36. That is, instead of producing a 180 degree relationship (note FIG. 1) between panels 22 and 24, the latching link 36 can be configured to produce a different relative angle, such as 270 degrees.

The hinge design of the present invention is further advantageous over prior art hinges in that it minimizes the distance which separates adjacent solar panels. Referring to FIG. 2, the adjacent solar panels 22 and 24 are shown in a deployed position. In an optimal configuration, the distance y which separates the panels 22 and 24 has a value approaching zero inches which maximizes solar surface area and allows for optimal panel layout. Obtaining zero separation is difficult because a hinge or a portion thereof having some volume is necessarily placed between the panels. In the large and bulky designs of prior art hinges, the distance y is relatively large having a value in the order of 1.50 inches. The hinge 18, 20 of the present invention deploys the solar panels achieving a separation distance y in the order of 0.090 inches. Referring now to FIG. 4a, there is shown a separation distance z which exists between adjacent solar panels when the panels are in a stowed position. Again, the distance z optimally approaches zero in order to minimize the space required to store the satellite during flight into orbit. The hinge design of the present invention produces a panel separation of approximately 0.20 inches thereby maintaining a low volume requirement when the panels are in their stowed position.

The hinge 18, 20 of the present invention described above is used, for example, in the hinged connection of two adjacent solar panels. However, when a hinged connection is desired between a solar panel and the body of the satellite, the hinge of the present invention is slightly altered in design. Referring to FIG. 1, there are shown hinges 14 and 16 which connect the solar panel 22 to the body of the satellite 10. This embodiment of the hinge is functionally identical to the hinge described above. Specifically, the housing, piston, pin, and spring components are all identical in form and function.

Figure 10:
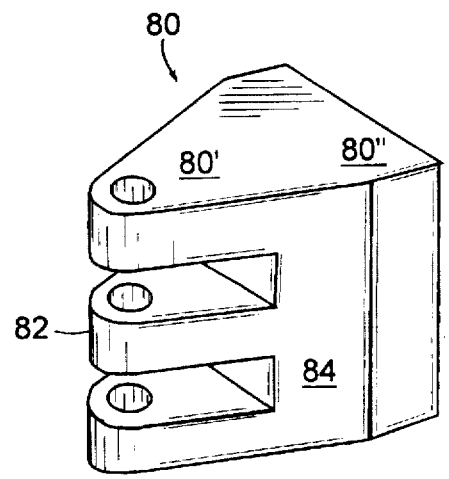
FIG. 10 is a perspective view of an alternative embodiment of the hinge latching link of the hinge of the present invention.
Figure 11A:
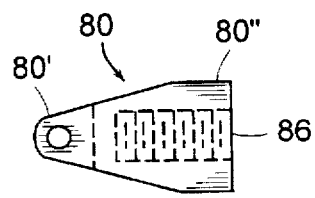
FIGS. 11a and 11b are plan and side views, respectively, of the alternative embodiment of the hinge latching link depicted in FIG. 10 of the hinge of the present invention.
Figure 11B:
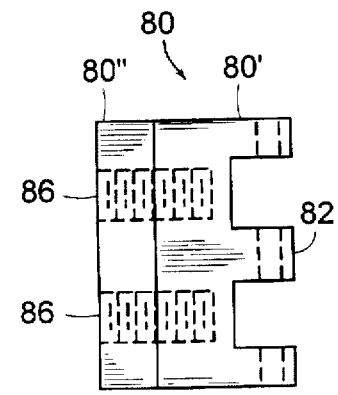

Referring now to FIGS. 10, 11a, and 11b, there is shown a latching link 80 of the second embodiment. Similar to the latching link of the first embodiment, the latching link 80 has a first side 80' having attachment prongs 82 which mate with the attachment prongs 35 on piston 32. The latching link 80' is further defined by surface 84 consisting of two planar surfaces which merge at the prongs 82. Latching link side 80' interacts with channel 60 of housing 26 in the identical manner described above with reference to the first embodiment. Latching link side 80" is a rectangular structure having connecting bores 86 formed therein. The connecting bores 86 of side 80" interact with a structure (not shown) located on the body of the satellite which is inserted into connecting bores 86. Preferably, the connection between the connection bores 86 and the attachment structure (not shown) on the satellite is a threaded connection as indicated. This provides a locked and accurate connection which establishes the orientation between the components. Alternative connection means which accurately lock and orient the link 80 with respect to the body of the satellite are suitable alternatives. In the hinge of the second embodiment, there is only one housing 26 and corresponding components which are utilized.

Utilizing the hinges of the first and second embodiments, a solar array of any size and for any type of spacecraft can be developed. The hinge of the second embodiment is used for connecting the first panel in the array to the body of the spacecraft. In smaller satellites (e.g., 5 ft. in height) utilizing smaller sized solar panels (e.g., 2×2 ft.), only two hinges located near the corners of each solar panel would be necessary to adequately secure and hinge each such panel to the body of the satellite. The number of hinges of the second embodiment used would depend upon the size and nature of the solar panels. The hinge of the first embodiment is used to hinge additional solar panels to the array as described above. Although FIG. 1 depicts a small satellite using two solar panels in the array, any number of panels could be securely hinged together using the hinge of the present invention.

Figure 12A:
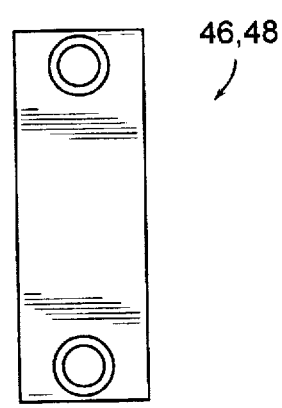
FIGS. 12a and 12b are frontal and side views, respectively, of the hinge housing plate of the hinge of the present invention.
Figure 12B:
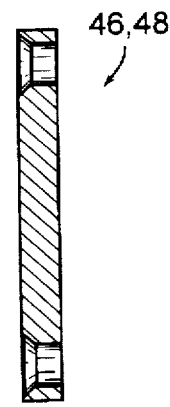

Referring now to FIGS. 12a and 12b, there is shown a housing plate 46, 48 which encloses housings 26, 28. During manufacture, pistons 32, 34 with compression spring 42, 44 thereabout are inserted into the bores 50 of housings 26, 28 from the rear end 56 toward the front end 54 of housings 26, 28. The pistons 32, 34 are inserted with the attachment prong 35 inserted into the rear end 56 of bore 50 first. After the pistons 32, 34 have been properly inserted into the bores 50, the housing plate 46, 48 is secured to the rear end 56 of the housing 26, 28, thereby completely enclosing the hinge components (viz. the pistons 32, 34 and compressions springs 42, 44). Housing plate 46, 48 is secured to the rear end 56 of the housing 26, 28 using bolts or any other suitable securing means, such as glue. Alternative structures for plate 46, 48 are considered to be within the scope of the invention, such as providing housing 26, 28 with an integral rear wall.

SUMMARY OF MAJOR ADVANTAGES OF THE INVENTION

After reading and understanding the foregoing detailed description of an inventive self latching and orienting hinge in accordance with preferred embodiments of the invention, it will be appreciated that several distinct advantages of the subject self latching and orienting hinge are obtained.

Without attempting to set forth all of the desirable features of the instant self latching and orienting hinge, at least some of the major advantages include a hinge which provides a reliable, predictable, quick, and accurate means to deploy spacecraft components. The hinge of the present invention includes a hinge housing 26, 28 with a receiving channel 60 and at least one bore 50. Received within bore 50 is at least one corresponding piston 32 having piston head 33 and attachment prong 35. The prong 35 of piston 32 engages prongs 72 of latching link 36, 80. Through the interaction of a side 36', 80' of the latching link 36, 80 and the channel 60 of the hinge housing 26, 28, a locking relationship is established between adjacent solar panels (or between a solar panel and satellite body in the case of the second embodiment). Unlike prior art hinges, the hinge of the present invention is self latching and consequently has no need for movable latch fingers or the like.

Due to the unique and novel structure of the latching link 36, 80 and the channel 60 of the housing 26, 28, the hinge of the present invention provides a self orienting feature not seen in the prior art. Specifically, the interaction of the surfaces 74, 76, 84 of the latching link 36, 80 with the surfaces 62, 64 of the channel 60 assures that the hinge is aligned and oriented in a predetermined manner. This feature is critical whenever sensitive and precisely positioned equipment is to be deployed from a spacecraft. The hinge 12, 14 of the present invention is a significant advantage over the prior art as it guarantees deployment of a spacecraft component (e.g., solar array, antenna boom, sensors) at a precise orientation in all six degrees of freedom.

Unlike the hinges of the prior art, hinge failure is virtually eliminated with the novel structure of the present invention. The hinge 14, 15 of the present invention only utilizes five components (viz. housing 26, 28; piston 32, 34; compression spring 42, 44; latching link 36, 80; and pin 38, 40, and an optional housing plate 46, 48) which are configured in a unique and novel manner to provide advantageous results.

The hinge 14, 18 of the present invention is about 40% lighter than the hinges of the prior art used for deploying spacecraft components. Moreover, substantially the entire hinge 14, 18 of the present invention is imbedded within the body of the solar panels 22, 24. This design feature creates additional space for solar panels and simplifies the layout of the solar panels in the array. The hinge 14, 18 of the present invention minimizes the distance between adjacent solar panels in both their deployed position and stowed position.

What is claimed:

1. A self latching hinge for hinging together first and second components comprising:

an elongate hinge housing having first and second ends and a receiving channel formed in said first end of said housing, and at least one elongate receiving bore formed within said housing such that said receiving bore has a circumferential wall extending from said second end toward said first end of said housing so as to define said at least one receiving bore, said at least one receiving bore communicating with said receiving channel at said first end of said housing, said housing secured to said first hinged component;

at least one elongate piston having first and second ends operably received within said at least one receiving bore with said first end of said elongate piston extending toward said first end of said housing, said at least one elongate piston operable within said receiving bore between an extended position and a retracted position;

means biasing the piston to the retracted position; and a rigid latching link having first and second sides, said first side of said latching link operably connected to said first end of said at least one elongate piston and substantially conforming in shape to said receiving channel of said first end of said housing, said second side of said link operably connected to said second hinged component such that when said at least one elongate piston is in said retracted position, said first side of said link is received within said receiving channel of said housing, wherein said receiving channel of said housing is non-cylindrical and shaped so that the hinged connection between said first component and said latching link is substantially restrained in all six degrees of freedom.

2. A self latching hinge as defined in claim 1, wherein said elongate hinge housing is substantially rectangular in cross-section.

3. A self latching hinge as defined in claim 1, wherein there are two elongate bores formed within said hinge housing each receiving a respective elongate piston.

4. A self latching hinge as defined in claim 1, wherein said receiving channel is defined by a first surface opposed to a second surface and a third surface opposed to a fourth surface.

5. A self latching hinge as defined in claim 4, wherein said first and second opposed surfaces are each tapered with respect to a longitudinal axis of said hinge housing such that said first surface and said second surface are tapered in opposite directions.

6. A self latching hinge as defined in claim 5, wherein said first and second opposing surfaces are each tapered at an angle of approximately 15 degrees with respect to the longitudinal axis of said hinge housing.

7. A self latching hinge as defined in claim 5, wherein said receiving channel is further defined by a first outer lip and a second outer lip such that said first surface of said receiving channel extends from a location within said channel to said first outer lip and said second surface of said receiving channel extends from a location within said channel to said second outer lip.

8. A self latching hinge as defined in claim 7, wherein said first and second outer lips extend along a perimeter of said channel and have an arcuate contacting surface.

9. A self latching hinge as defined in claim 7, wherein a first and second surfaces are planar surfaces.

10. A self latching hinge as defined in claim 9, wherein the respective adjacent surfaces of said first, second, third and fourth surfaces of said receiving channel adjoin through a small radius of curvature.

11. A self latching hinge as defined in claim 5, wherein said first side of said latching link is defined by a first tapered surface and a second tapered surface such that when said at least one piston is in its retracted position and said first side of said link is received within said receiving channel, said first tapered surface of said first side of said link interacts with said first tapered surface of said receiving channel and said second tapered surface of said first side of said link interacts with said second tapered surface of said receiving channel.

12. A self latching hinge as defined in claim 1 further comprising a pin which connects the link to said first end of said at least one elongate piston, said pin extending through an attachment hole formed in said first end of said at least one elongate piston and attached prongs formed in said first side of said link.

13. A self latching hinge as defined in claim 1, wherein said second side of said link is substantially rectangular in cross section and is formed with an attachment bore for receiving a mating element secured to said second hinged component.

14. A self latching hinge as defined in claim 1, wherein said elongate piston comprises a piston head having a diameter substantially corresponding to the diameter of said at least one receiving bore and a shaft portion extending from said head portion and having a diameter less than said head portion.

15. A self latching hinge as defined in claim 14, wherein a compression spring is received within said at least one elongate bore of said hinge housing such that said compression spring is circumscribed about said shaft portion of said piston, a first end of said compression spring abuts said piston head and a second end of said compression spring abuts an inner wall of said hinge housing through which said at least one elongate piston extends.

16. A self latching hinge as defined in claim 1, wherein a compression spring is received within said at least one receiving bore of said hinge housing and operably interacts with said piston so as to apply a force to said piston tending to cause said second end of said piston to move toward said second end of said housing.

17. A self latching hinge as defined in claim 1 further comprising a hinge plate secured to the said second end of said hinge housing and which defines a rear wall of said at least one elongate bore.

18. A self latching hinge as defined in claim 1, wherein said elongate hinge housing further comprises a plurality of through bores which extend perpendicular to a longitudinal axis of said hinge housing and are arranged about a perimeter of said housing.

19. A self latching hinge as defined in claim 1 wherein said first component is a solar panel and said second component is the body of a satellite.

20. A self latching hinge for hinging together first and second components comprising:

first and second elongate hinge housings wherein each of said housings has a first and second end, a receiving channel formed in said first end of said housing, and at least one elongate receiving bore formed within said housing such that said receiving bore has a circumferential wall extending from said second end toward said first end of said housing so as to define said at least one receiving bore, said at least one receiving bore communicating with said receiving channel at said first end of said housing, said elongate first and second housings being secured to said first and second hinged components respectively;

each housing including at least one elongate piston having first and second ends operably received within said at least one receiving bore with said first end of said elongate piston extending toward said first end of said housing, said at least one elongate piston being operable within said receiving bore between an extended position and a retracted position;

means biasing the pistons to the retracted positions; and a rigid latching link having first and second sides, said first side of said latching link operably connected to said first end of said at least one elongate piston of said first housing and substantially conforming in shape to said receiving channel of said first end of said first housing, and said second side of said latching link operably connected to said first end of said at least one elongate piston of said second housing and substantially conforming in shape to said receiving channel of said first end of said second housing, such that when said elongate pistons of said first and second housings are in said retracted positions, said first side of said link is received within said receiving channel of said first housing and the second side of said link is received within said receiving channel of said second housing, wherein said receiving channels of said first and second housings are non-cylindrical and shaped so that a hinged connection between said first and second components is substantially restrained in all six degrees of freedom.

21. A self latching hinge as defined in claim 20 wherein said first and second hinged components are solar panels of a solar array.

22. A solar panel array for attachment to a spacecraft comprising:

first and second solar panels whereby the first solar panel is hinge connected to the spacecraft by at least a first pair of hinges and the second solar panel is hinge connected to the first solar panel by at least a second pair of hinges, said at least first pair of hinges comprising:

an elongate hinge housing having first and second ends and a receiving channel formed in said first end of said housing, and at least one elongate receiving bore formed within said housing such that said receiving bore has a circumferential wall extending from said second end toward said first end of said housing so as to define said at least one receiving bore, said at least one receiving bore communicating with said receiving channel at said first end of said housing, said housing imbedded within the body of the first solar panel; and at least one elongate piston having first and second ends operably received within said at least one receiving bore with said first end of said elongate piston extending toward said first end of said housing, said at least one elongate piston operable within said receiving bore between an extended position and a retracted position; and means biasing the piston to the retracted position; and a latching link having first and second sides, said first side of said latching link operably connected to said first end of said at least one elongate piston and substantially conforming in shape to said receiving channel of said housing end of said housing, said second side of said link operably connected to the body of the spacecraft such that when said at least one elongate piston is in said retracted position, said first side of said link is received within said receiving channel of said housing, wherein said receiving channel is shaped so that the hinged connection between the first solar panel and the body of the spacecraft is substantially restrained in all six degrees of freedom; and wherein said at least second pair of hinges comprise: first and second elongate hinge housings wherein each of said housings has a first and second end, a receiving channel formed in said first end of said housing, and at least one elongate receiving bore formed within said housing such that said receiving bore has a circumferential wall extending from said second end toward said first end of said housing so as to define said at least one receiving bore, said at least one receiving bore communicating with said receiving channel at said first end of said housing, said elongate first housing is imbedded within the body of the first solar panel opposite the imbedded housing of the first pair of hinges and said elongate second housing is imbedded within the body of the second solar panel; and each housing including at least one elongate piston having first and second ends operably received within said at least one receiving bore, with said first end of said elongate piston extending toward said first end of said housing, said at least one elongate piston being operable within said receiving bore between an extended position and a retracted position; and means biasing the pistons to the retracted positions; and a latching link having first and second sides, said first side of said latching link operably connected to said first end of said at least one elongate piston of said first housing and substantially conforming in shape to said receiving channel of said first end of said first housing, and said second side of said latching link operably connected to said first end of said at least one elongate piston of said second housing and substantially conforming in shape to said receiving channel of said first end of said second housing, such that when said elongate pistons of said first and second housings are in said retracted positions, said first side of said link is received within said receiving channel of said first housing and the second side of said link is received within said receiving channel of said second housing, wherein said receiving channels of said first and second housings are noncylindrical and shaped so that a hinged connection between said first solar panel and second solar panel is substantially restrained in all six degrees of freedom; and whereby said solar array is movable between a stowed position and a deployed position such that when the solar array is in said deployed position it is locked into the deployed position and substantially restrained in all six degrees of freedom.

* * * * *